United States Patent [19]

Valoppi et al.

[11] Patent Number: 5,324,754

[45] Date of Patent: Jun. 28, 1994

[54] LITHIUM-BASED SALTS IN FLEXIBLE FOAMS

[75] Inventors: Valeri L. Valoppi, Southgate; Donald L. Christman, Grosse Ile, both of Mich.

[73] Assignee: BASF Corporation, Parsippany, N.J.

[21] Appl. No.: 990,405

[22] Filed: Dec. 14, 1992

[51] Int. Cl.$^5$ ............................................. C08G 18/00
[52] U.S. Cl. ................................ 521/125; 252/182.24; 252/182.27; 252/182.28; 521/155; 521/170; 521/129
[58] Field of Search ...................... 252/182.24, 182.27, 252/182.28; 521/125, 155, 170, 129

[56] References Cited

U.S. PATENT DOCUMENTS

| | | | |
|---|---|---|---|
| 3,108,975 | 10/1963 | Lambert et al. | 521/129 |
| 3,803,063 | 4/1974 | Krenz, Jr. | 521/129 |
| 4,250,005 | 2/1981 | Lamplugh | 521/129 |

*Primary Examiner*—Morton Foelak
*Attorney, Agent, or Firm*—Dennis V. Carmen

[57] ABSTRACT

The invention pertains to polyol compositions containing a lithium salt of an aliphatic or cycloaliphatic, saturated or unsaturated carboxylic acid having 2 to 7 carbon atoms and to flexible polyurethane foams having an open cell structure produced thereby.

12 Claims, No Drawings

LITHIUM-BASED SALTS IN FLEXIBLE FOAMS

FIELD OF THE INVENTION

The following invention relates to the field of flexible slabstock or integral skin polyurethane foams, more particularly to the use of lithium-based salts to open the cells of water-blown polyurethane foams, producing a foam with less shrinkage and a softer feel. The flexible polyurethane foams of the invention can be used as carpet underlay, seat cushions, steering wheels, among other typical uses for flexible slabstock and integral skin foams.

BACKGROUND OF THE INVENTION

Water-blown polyurethane foams contain many urea segments by the reaction between the isocyanate and water. Since the urea bond is less flexible than a polyurethane bond, the urea segments disadvantageously cause the foam to have a hard feel. Further, water tends to close the cells of the foam, which, in the case of slabstock foam, generally requires mechanical crushing to avoid puckering. By opening the cells of the foam with the lithium salts of the invention, one obtains a polyurethane flexible foam which is dimensionally stable and does not shrink either as a free rise or in the mold.

U.S. Pat. No. 3,108,975 describes the production of flexible polyurethane foams using certain basic compounds as catalysts without the need to employ amine-based catalysts. Described as catalysts were hydroxides of lithium, potassium, and sodium, with potassium and sodium emphasized and exemplified. Also mentioned were carboxylic acid salts of these metals, the carboxylic acids being predominately long chained but also including acetic and phthalic acid. The requirement for each of these compounds, however, is that they exhibit predominately basic activity and act as a source of hydroxide ions or anions to catalyze the reaction between isocyanate and polyol in a water-blown system. Thus, with an acetate group, the basic compound potassium acetate is exemplified; and with a water-based metal such as sodium, sodium hydroxide is exemplified. In the present invention, however, the lithium metal ion exhibits much weaker basic activity than sodium or potassium ions; and when combined with stronger short chain carboxylic acids having 1-6 carbon atoms, the lithium salts exhibit insufficient basic activity to act as catalyst substitutes for the above-described amine-based catalysts of U.S. Pat. No. 3,108,975.

U.S. Pat. No. 3,041,295 also describes the use of a lithium compound in flexible polyurethane water-blown foams but only in combination with a phosphate ester to prevent high temperature, high humidity breakdown of the foam. As in the previous patent, the lithium compound must exhibit basic activity; and exemplified are lithium carbonate, lithium hydroxide, and lithium ricinoleate. The lithium salts of the invention, however, are short chain carboxylic acid salts of lithium, which salts exhibit very weak basic, almost neutral, activity and are used as cell openers and aids in reduction of foam density.

SUMMARY OF THE INVENTION

It is an object of the invention to obtain a water-blown flexible polyurethane foam having an open-celled structure without sacrificing physical properties. The open-celled structure in the foams of this invention advantageously promotes dimensional stability even at low densities without signs of shrinkage or warp.

It has been found that by incorporating a lithium salt of an aliphatic or cycloaliphatic carboxylic acid having 2-7 carbon atoms into a polyol resin yields a foam having an excellent open-cell structure when reacted with an isocyanate in the presence of water as the blowing agent. Such flexible foams have a soft feel in spite of the formation of hard urea linkages without sacrificing physical properties. Thus, a polyol composition comprising a polyol compound, one or more blowing agents, a urethane-promoting catalyst, optionally chain extenders, and a lithium salt of a 2-7 carbon atoms carboxylic acid is provided along with the flexible foams made by reacting a polyisocyanate with the polyol composition and a process for its preparation.

DETAILED DESCRIPTION OF THE INVENTION

The lithium salts employed in the invention are salts of aliphatic or cycloaliphatic, saturated or unsaturated, substituted or unsubstituted carboxylic acids having from 2-7 carbon atoms including the carboxylic acid carbon, such as lithium salts of acetic acid, propionic acid, butyric acid, valeric acid, caproic acid, heptanoic acid, and their anhydrides which produce the foregoing acids when hydrolyzed. Preferable acids are acetic, propionic, and butyric, with acetic acid being more preferable.

The amount of lithium salt contained in the formulation is from 0.01 pbw to about 5.0 pbw, preferably 0.01 pbw to about 3 pbw, more preferably 0.1 pbw to 2 pbw, most preferably 0.5 pbw to 1.0 pbw, based on 100 parts by weight of polyol composition. The term "polyol composition" refers to all ingredients in the polyol side, including the polyol compound(s), chain extenders, blowing agent, surfactant, catalysts, and other ingredients. Although one may exceed amounts greater than 3.0 pbw of lithium salt, there is no further noticeable improvement in cell opening.

The lithium salt containing flexible polyurethane foams of this invention may be blown with reactive blowing agents, physically active blowing agents excluding hard or fully halogenated chlorofluorocarbons, or a mixture of the two kinds of blowing agents.

In one preferable embodiment of the invention, the polyurethane foam is completely blown by reactive blowing agents. The phrase "reactive blowing agent" is meant herein as a blowing agent other than a physically active blowing agent such as volatile hydrocarbons, soft chlorofluorocarbons (HCFCs), and fully halogenated hydrocarbons known as hard CFCs. A reactive blown foam is one which altogether excludes the presence of the aforementioned physical blowing agents from the foam system.

The phrase "reactive blowing agents" is meant, however, to include chemically reactive blowing agents such as, but not limited to, water, a mixture of water and formic acid, or tertiary alcohols. Formic acid may be added to the resin side as the acid, as an acid premixed with the lithium salt, or as a formate salt dissolved in water. The flexible foam of this invention is most preferably water blown, meaning a foam system blown without the aid of any other reactive or physical blowing agent.

The amount of water in the system ranges from 0.01 parts by weight to 8.0 parts by weight based on 100 parts by weight of the polyol compound, chain extender, and catalyst. The particular amount depends upon the desired density. To achieve free rise densities of less than 4.0 suitable for carpet underlay, only about 8 parts by weight, preferably less than 6.0, more preferably less than 2.0 parts by weight of water need be employed in water blown systems. In molded flexible foams having densities from about 3 pcf to 35 pcf, anywhere from 0.5 to about 5 parts by weight of water are employed.

In another embodiment of the invention but less preferable, the polyurethane foams can be blown solely with volatile hydrocarbons, soft CFCs each having a boiling point below 28° C. and above −60° C. and which vaporize at or below the temperature of the foaming mass, volatile fluorinated organic compounds, or with a mixture of these physical blowing agent(s) and reactive blowing agent(s). Volatile hydrocarbons include butane, pentane, hexane, heptane, cyclopentane, cyclohexane, pentene, and heptene. Soft CFCs are defined as having at least one hydrogen atom and an ozone depletion potential of less than 0.2, and include 1,1,1-trichloroethane, HCFC-141b, HCFC-22, HCFC-123, and HCFC-142. In another embodiment, a mixture of physical blowing agents, excluding hard CFCs, and reactive blowing agents may be employed. Preferably, the quantity of reactive blowing agent predominates in a mixture with physical blowing agent(s). As the ratio of physical blowing agent to reactive blowing agent increases in a mixture, the total amount of blowing agent required to make a foam at a given density also increases.

The type of isocyanate or polyol compounds employed to obtain an energy absorbing polyurethane foam are not restricted to a narrow range of choices. The lithium salts described herein are employed in a wide variety of flexible polyurethane foams prepared by the reaction of organic polyisocyanate with polyol composition comprising a polyol compound having at least two isocyanate reactive hydrogens in the presence of a blowing agent, a urethane promoting catalyst, and a surfactant. The reaction is carried out at an index ranging from 60 to 150, preferably 60 to less than 110 to promote polyurethane linkages.

Suitable examples of the compound having at least two isocyanate reactive hydrogens include polyols such as polyoxyalkylene polyether polyols, polyoxyalkylene polyester polyols, and graft polyols; polyhydric polythioethers; polyhydroxyl-containing phosphorous compounds; polyacetals; and aliphatic thiols. These compounds have an average functionality of about 1.5 to 8, preferably about 1.5 to 3, a hydroxyl number from about 15 to about 100, preferably 15 to 50, and equivalent weights ranging from about 750 to about 3500, preferably 1000 to about 2000.

Suitable hydroxy-terminated polyester include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, theraphthalic acid, phthalic acid, hemimellitic acid, and 1,4-cyclohexanedicarboxylic acid. A suitable polyhydric alcohol may be used such as ethylene glycol, propylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylolpropane, 1,1,1-trimethylolethane, and 1,2,6-hexanetriol. Also included within the term "polyhydric alcohol" are compounds derived from phenol such as 2,2-bis(4-hydroxyphenyl)-propane, commonly known as Bisphenol A.

Suitable polyoxyalkylene polyether polyols may be used such as the polymerization product of an alkylene oxide with a polyhydric alcohol. Suitable polyhydric alcohols include those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, propylene glycol, dipropylene glycol, and 2,2-bis(4-hydroxyphenyl)-propane and blends thereof having equivalent weights of from 1000 to 2000.

Suitable amines which may be condensed with alkylene oxides include aromatic amines such as aniline, N-alkylphenylene-diamines, 2,4'-,2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine and triisopropanolamine.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable as the polyol are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene- 1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3.3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate, and mixtures thereof. Especially useful due to their availability and properties are 2,4'-toluene diisocyanate, and 2,6'-toluene diisocyanate for slabstock, and 4,4'-diphenylmethane diisocyanate, polymethylene polyphenylene polyisocyanate, or mixtures thereof for molded foams, or mixtures of the foregoing.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

Also used as polyisocyanate are so-called modified multi functional isocyanates, that is, products which are obtained by the chemical reaction of the above-mentioned di- and/or polyisocyanates. Examples for modified organic di- and polyisocyanates include, for example, carbodiimide group containing polyisocyanates in accordance with German Patent No. 1,092,007, allophanate group containing polyisocyanates as they are described, for instance, the British Patent No. 994,890, and the published data of Belgian Patent No. 761,626 and the Netherlands Published Application No. 7,102,524; urethane group containing polyisocyanates as described, for instance, in published data of Belgian Patent No. 752,261 or U.S. Pat. No. 3,394,164; aceylated urea group containing polyisocyanates, for instance, in accordance with German Patent No. 1,230,778; biuret group containing polyisocyanates, for instance, in accordance with German Patent No. 1,101,394 and British Patent No. 889,050; polyisocyanates produced by telemerization reactions, for instance, corresponding with the published data of Belgian Patent No. 723,640; ester group containing polyisocyanates as they are mentioned, for instance, in British Patents 965, 474 and 1,072,956; U.S. Pat. No. 3,567,765 and German Patent No. 1,231,688.

Also useful are quasi-prepolymers prepared by reacting any of the above polyisocyanates, crude isocyanates, modified isocyanates, or mixtures thereof with a high molecular weight (1,500-6,000 MW) polyol, preferably a polyoxyalkylene polyether polyol. Most preferable for molded parts are the quasi-prepolymers described in co-pending application Ser. No. 07/902,137, filed Jun. 22, 1992, allowed on Oct. 19, 1992, incorporated herein by reference.

Chain extenders which may be employed in the preparation of the polyurethane foams include compounds having at least two functional groups bearing active hydrogen atoms such as hydrazine, primary and secondary diamines, amino alcohols, amino acids, hydroxy acids, glycols, or mixtures thereof. The phrase "chain extenders" used herein is not meant to include water. A preferred group of chain-extending agents, if used, includes diethylene glycol, 1,4-butanediol and primary and secondary diamines such as phenylene diamine, 1,4-cyclohexane-bis-(methylamine), ethylenediamine, diethylenetriamine, N-(2-hydroxypropyl)ethylene-diamine, N,N'-di(2-hydroxypropyl)ethylenediamine, piperazine, and 2-methylpiperazine.

Any suitable urethane-promoting catalyst may be used including tertiary amines such as, for example, triethylenediamine, N-methylmorpholine, N-ethylmorpholine, diethylethanolamine, N-cocomorpholine, 1-methyl-4-dimethylamino-ethylpiperazine, 3-methoxypropyldimethylamine, N,N,N'-trimethyl-isopropyl propylenediamine, 3-diethylaminopropyldiethylamine, dimethylbenzylamine, and the like. Other suitable catalysts are, for example, stannous chloride, dibutyltin di-2-ethyl hexanoiate, stannous oxide, as well as other organometallic compounds such as are disclosed in U.S. Pat. No. 2,846,408, incorporated herein by reference.

A surface-active agent is generally necessary for production of high grade polyurethane foam according to the present invention, since in the absence of same, the foams collapse or contain very large uneven cells. Numerous surface-active agents have been found satisfactory. Non-ionic surface active agents are preferred. Of these, the non-ionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

If desired, flame retardants may be incorporated in the foams. Among the flame retardants which may be employed are: pentabromodiphenyl oxide, dibromopropanol, tris(b-chloropropyl)-phosphate, 2,2-bis(bromoethyl) 1,3-propanediol, tetrakis(2-chloroethyl)ethyl diphosphate, bis-(2-chloroethyl) 2-chloroethylphosphonate, molybdenumtrioxide, ammonium molybdate, ammonium phosphate, pentabromodiphenyl oxide, tricresylphosphate, hexabromocyclododecane and dibromoethyl dibromocyclohexane.

Suitable methods of preparation include the prepolymer technique wherein an excess of organic polyisocyanate is reacted with a polyol to prepare a prepolymer having free isocyanate reactive groups, which is then reacted with a mixture of water, surfactant, and catalyst to obtain the foam. Alternatively, one may employ the quasi-prepolymer technique common in the preparation of rigid foams by reacting only a part of the polyol with the organic polyisocyanate to obtain a quasi-prepolymer, which is then reacted with the remaining portion of polyol in the presence of water, surfactant, and catalyst. Another option is to prepare a foam by reacting all the components in a single working step known as the "one-shot" method. In the one-shot method, the components may be mixed in a mix head or by impingement mixing.

The polyurethane components combined by any one of the above-mentioned techniques may be poured or sprayed into an open mold, which is subsequently closed and clamped, if necessary, to allow the components to fully react, after which the part is demolded and allowed to cure. Alternatively, the polyurethane components may be injected into an open or closed mold, which is subsequently closed if the components were initially injected into an open mold; and the components are allowed to fully react after which the part is demolded and set aside to cure.

The mixed polyurethane components may also be poured, injected, or sprayed into open cavities or molds and allowed to free rise instead of reacting in a closed mold, such as in the production of slab stock which is cut into a desired shape, or poured or sprayed into an open mold which is clamped shut.

When using the one-shot process, the lithium salts of the invention should be pre-dissolved in water or the polyol depending on the solubility of the organic portion of the salt. Instead of pre-dissolving the lithium salt prior to metering, the lithium salt may be separately metered and added to the formulation as a solid. However, the salt must be milled to a fine dust as large granules fail to quickly dissolve in the formulation and fail to open up the cells of the foam. Regardless of which foaming method is employed, the prepolymer, one-shot, or quasi-prepolymer method, it is preferred to pre-dissolve the lithium salt in either the polyol or water, most preferably dissolved in water as a solution which is added to the polyol side or dissolved in formic acid as a solution which is added to the polyol side.

The following Examples illustrate various embodiments of the invention and are not intended to limit the scope of the invention herein. The parts referred to in the Examples are parts by weight. The following abbreviations are employed:

| | |
|---|---|
| Polyol A | is a propylene oxide-ethylene oxide adduct of glycerine having terminated with about 18.5 weight percent ethylene oxide, having a theoretical hydroxyl number of 35, and an average functionality of about 2.6. |
| Polyol B | is an all propylene oxide adduct of propylene glycol having a nominal hydroxyl number of 29. |
| Polyol C | is a propylene oxide-ethylene oxide adduct of trimethylolpropane, having a 13 weight percent ethylene oxide cap, a nominal hydroxyl number of about 35, and an average functionality of about 2.6. |
| Polyol D | is a 30 weight percent 1:1 acrylonitrile/styrene graft polyol in Polyol C as the carrier, the graft polyol having a nominal hydroxyl number of 24. |
| Polyol E | is about a 74/26 weight percent blend of Polyol D and Polyol C, respectively, having a nominal hydroxyl number of 26.7. |
| Polyol F | is a propylene oxide-11.4 weight percent ethylene oxide heteric adduct of a glycerine/propylene glycol blend having a nominal hydroxyl number of 47 and an average functionality of about 2.5. |
| Polyol G | is a propylene oxide-ethylene oxide adduct of trimethylolpropane terminated with about 15 weight percent ethylene oxide and having a hydroxyl number of 25 and an average functionality of about 2.3. |
| Polyol H | is about a 33/67 blend of Polyol G and Polyol D, respectively. |
| Iso A | is a 98 weight percent 4,4'-diphenylmethane diisocyanate having 2 weight percent of other MDI isomers, an NCO content of 33.6 weight percent, and a functionality of about 2. |
| Iso B | is a uretonimine-carbodiimide modified 4,4'-MDI containing about 75 weight percent 4,4' MDI and 25 weight percent of a uretonimine-carbodiimide modified 4,4'-MDI, having an NCO content of about 29.5 weight percent. |
| IsO C | is a solvent-free polymethylene polyphenylisocyanate with a functionality of approximately 2.2, an NCO content of 31.5 weight percent, and available from BASF Corporation as LUPRANATE TM M-10. |
| Iso D | is a solvent-free polymethylene polyphenylisocyanate with a functionality of about 2.7, an NCO content of 31.8 weight percent, and available from BASF Corporation as LUPRANATE TM M-205. |

| | -continued |
|---|---|
| DABCO BL-11 | is a 70 weight percent bis(dimethylaminoethyl)ether and 30 weight percent dipropylene glycol blowing catalyst available from Air Products. |
| DABCO XFE-1027 | is an amine catalyst used as a delayed action gel available from Air Products. |
| UL-1 | is an organotin catalyst available from Witco Corporation. |
| LIAL-125 | is an oxo alcohol; a linear $C_{12}$–$C_{15}$ alcohol composition available from Enichem Agusta. |
| X2-5384 | is a silicone super wetting surfactant available from Air Products. |
| PPK-839 | is carbon black in a polyether polyl. |
| Univul AO3 | is an anti-oxidant available from BASF Corporation. |
| Givsorb UV-1 | is an ultraviolet stabilizer available from Givuadan Corporation. |
| DABCO 33-LV | is 33 weight percent TEDA in 67 weight percent DPG available from Air Products. |
| DABCO T-10 | is 50 weight percent stannous octoate in dioctylphthalate. |
| DABCO T-12 | is dibutyltin dilaurate. |
| BICAT V | is a bismuth-based organo carboxylate catalyst available from Shephard Company. |
| FYROL FR-2 | is a halogenated phosphate flame retardant available from Great Lakes Corp. |
| L-520 | is a silicone surfactant available from Union Carbide Corp. |
| Y-10223 | is a silicone surfactant available from Goldschmidt Corp. |
| DEOA LF | is an 85/15 mixture of diethanolamine and water, respectively. |

EXPERIMENT 1

This experiment was performed to determine the cell-opening effects of the foam by using the lithium salt in the presence of an amine catalyst and water as a blowing agent in the manufacture of flexible polyurethane foams based on TDI, MDI, and isocyanate mixtures thereof.

Foam Sample 1 was prepared by reacting toluene diisocyanate (TDI) with the resin component in the part-by-weight proportions indicated in Table 1 below. The resin component ingredients were hand mixed in a 1-quart Ponderosa cup at about 2,400 rpm using a 3" mixer blade for a few seconds at each successive addition of resin ingredients. The isocyanate was then mixed in with the resin at about 3,000 rpm for about 7–8 seconds, and the mixture was allowed to freely foam.

The tops of each foam sample were cut flush with the top of the cup, and the density of the foam was then measured. Core samples were taken from each to measure the properties of the foam. A second sample using identical ingredients was run without the lithium salt as a comparison. This procedure was repeated for Samples 2–10.

TABLE 1

| SAMPLES[e] | 1 | 1C | 2 | 2C | 3 | 3C | 4 | 4C | 5 | 5C |
|---|---|---|---|---|---|---|---|---|---|---|
| POLYOL F | 300 | 300 | — | — | — | — | — | — | — | — |
| POLYOL D | — | — | 600 | 600 | 600 | 600 | 600 | 600 | 600 | 600 |
| POLYOL H | — | — | — | — | — | — | — | — | — | — |
| L-520 | 3.0 | 3.0 | — | — | — | — | — | — | — | — |
| Y-10223 | — | — | 5.4 | 5.4 | 5.4 | 5.4 | 5.4 | 5.4 | 5.4 | 5.4 |
| DABCO 33LV. | 0.75 | 0.75 | 2.4 | 2.4 | 2.4 | 2.4 | 2.4 | 2.4 | 2.4 | 2.4 |
| T-10 | 1.5 | 1.5 | — | — | — | — | — | — | — | — |
| 1:1 WT. % T-12 IN POLYOL G | — | — | 0.6 | 0.6 | 0.6 | 0.6 | 0.6 | 0.6 | 0.6 | 0.6 |
| BICAT V | 0.2 | 0.2 | — | — | — | — | — | — | — | — |
| FYROL FR-2 | — | — | 18 | 18 | 18 | 18 | 18 | 18 | 18 | 18 |
| DIETHANOLAMINE LF | — | — | 4.8 | 4.8 | 4.8 | 4.8 | 4.8 | 4.8 | 4.8 | 4.8 |
| WATER | 9.55 | 15 | 1.07 | 12 | 1.07 | 12 | 1.07 | 12 | 1.07 | 12 |
| LITHIUM ACETATE.$2H_2O$[a] | 8.4 | — | 16.9 | — | 16.9 | — | 16.9 | — | 16.9 | — |
| WATER/100 pbw POLYOL[b] | 5.0 | 5.0 | 2.12 | 2.12 | 2.12 | 2.12 | 2.12 | 2.12 | 2.12 | 2.12 |
| Moles LiOAc/100 pbw POLYOL[c] | 15 | — | 15 | — | 15 | — | 15 | — | 15 | — |
| Calc OH No. (Resin) | 313 | 316 | 157 | 157 | 157 | 157 | 157 | 157 | 157 | 157 |
| TDI | 179 | 178 | — | — | 74 | 74 | 37 | 37 | 158 | 158 |
| ISO D | — | — | 226 | 226 | 113 | 113 | 170 | 170 | — | — |
| ISO C | — | — | — | — | — | — | — | — | — | — |
| INDEX | 105 | 105 | 94 | 94 | 94 | 94 | 94 | 94 | 94 | 94 |
| DENSITY, pcf | 1.16 | 1.16 | 7.13 | 6.44 | 4.30 | 4.42 | 5.18 | 4.38 | 3.15 | 3.61 |
| AIR FLOW, cfm | 0.18 | 0.08 | 0.74 | 0.55 | 1.14 | 0.83 | 1.15 | 1.09 | 0.70 | 0.31 |
| ILD, lbs., 25% LOAD | 42 | 52 | 279 | 274 | 91 | 111 | 172 | 167 | 38 | 63 |
| ILD, lbs., 65% LOAD | 88 | 95 | — | 823 | 268 | 336 | 442 | 456 | 105 | 197 |
| CLD, psi-50% compression-original | 0.55 | 0.67 | 9.60 | 7.69 | 2.26 | 2.48 | 3.94 | 3.51 | 0.86 | 1.39 |
| CLD, psi-50% compression-HUAG[d] | 0.04 | 0.32 | 6.39 | 5.60 | 0.88 | 1.07 | 2.13 | 2.07 | 0.48 | 0.74 |

| SAMPLES[e] | 6 | 6C | 7 | 7C | 8 | 8C | 9 | 9C | 10 | 10C |
|---|---|---|---|---|---|---|---|---|---|---|
| POLYOL F | — | — | — | — | — | — | — | — | — | — |
| POLYOL D | — | — | — | — | — | — | — | — | — | — |
| POLYOL H | 600 | 600 | 600 | 600 | 600 | 600 | 600 | 600 | 600 | 600 |
| L-520 | — | — | — | — | — | — | — | — | — | — |
| Y-10223 | 5.4 | 5.4 | 5.4 | 5.4 | 5.4 | 5.4 | 5.4 | 5.4 | 5.4 | 5.4 |
| DABCO 33LV. | 2.4 | 2.4 | 2.4 | 2.4 | 2.4 | 2.4 | 2.4 | 2.4 | 2.4 | 2.4 |
| T-10 | — | — | — | — | — | — | — | — | — | — |
| 1:1 WT. % T-12 IN POLYOL G | 0.6 | 0.6 | 0.6 | 0.6 | 0.6 | 0.6 | 0.6 | 0.6 | 0.6 | 0.6 |
| BICAT V | — | — | — | — | — | — | — | — | — | — |

TABLE 1-continued

| | | | | | | | | | | |
|---|---|---|---|---|---|---|---|---|---|---|
| FYROL FR-2 | 18 | 18 | 18 | 18 | 18 | 18 | 18 | 18 | 18 | 18 |
| DIETHANOLAMINE LF | 4.8 | 4.8 | 4.8 | 4.8 | 4.8 | 4.8 | 4.8 | 4.8 | 4.8 | 4.8 |
| WATER | 14.1 | 18 | 14.1 | 18 | 14.1 | 18 | 14.1 | 18 | 14.1 | 18 |
| LITHIUM ACETATE.2H$_2$O[a] | 5.63 | — | 5.63 | — | 5.63 | — | 5.63 | — | 5.63 | — |
| WATER/100 pbw POLYOL[b] | 3.12 | 3.12 | 3.12 | 3.12 | 3.12 | 3.12 | 3.12 | 3.12 | 3.12 | 3.12 |
| Moles LiOAc/100 pbw POLYOL[c] | 5 | — | 5 | — | 5 | — | 5 | — | 5 | — |
| Calc OH No. (Resin) | 212 | 215 | 212 | 215 | 212 | 215 | 212 | 215 | 212 | 215 |
| TDI | — | — | — | — | — | — | — | — | — | — |
| ISO D | 295 | 298 | 147 | 149 | 139 | 141 | 156 | 157 | 164 | 166 |
| ISO C | — | — | 147 | 149 | 139 | 141 | 156 | 157 | 164 | 166 |
| INDEX | 90 | 90 | 90 | 90 | 85 | 85 | 95 | 95 | 100 | 100 |
| DENSITY, pcf | 3.84 | 4.21 | 3.56 | 3.69 | 3.64 | 3.83 | 3.44 | 3.51 | 3.10 | 3.6 |
| AIR FLOW, cfm | 1.25 | 0.69 | 1.03 | 0.71 | 1.23 | 0.60 | 0.97 | 0.64 | 1.28 | 0.74 |
| ILD, lbs., 25% LOAD | 111 | 104 | 97 | 90 | 87 | 86 | 101 | 105 | 93 | 119 |
| ILD, lbs., 65% LOAD | 275 | 273 | 238 | 220 | 2.8 | 2.06 | 232 | 242 | 222 | 278 |
| CLD, psi-50% compression-orginal | 2.37 | 2.67 | 2.13 | 1.89 | 1.77 | 1.98 | 2.19 | 2.17 | 1.78 | 2.55 |
| CLD, psi-50% compression-HUAG[d] | 2.17 | 2.68 | 1.78 | 1.69 | 1.50 | 1.67 | 2.03 | 2.02 | 1.54 | 2.48 |

[a]120 grams LiOAc.2H$_2$O in 100 g water (64.7% water including water of hydration);
[b]Includes 15% water in DEOA LF;
[c]10 m Moles LiOAc = 0.66 g;
[d]humid aged;
[e]All samples 2-10 post-cured 1 hr. @ 200° F. + 2 hrs. @ 300° F.

The results show that the air flow from each sample employing lithium acetate salt increased by as much as 50 percent over those foam samples using no lithium acetate, indicating that the cells opened up substantially. The density of the foam samples using lithium acetate were generally slightly lower, indicating that at equivalent water levels a slightly lower density may be achieved.

EXPERIMENT 2

The purpose of this experiment was to determine whether lithium salts would have a detrimental effect on the mechanical properties of an integral skin foam by virtue of their cell-opening effect. In this experiment, a quasi-prepolymer was prepared as the iso component for reaction with a resin side component.

PREPARATION OF A QUASI-PREPOLYMER

To a clean, dry, nitrogen-purged reactor is charged with 54.5 weight percent molten Isocyanate A, about 21.6 weight percent Isocyanate B, and 0.003 weight percent benzoyl chloride. The ingredients are agitated under a nitrogen blanket throughout the reaction. The reactants are heated to about 60° C., after which about 23.9 weight percent of Polyol B is added at a constant rate over a one-hour period of time. The reaction is continued for the next three hours at 60°-65° C. and then cooled. The quasi-prepolymer had a free NCO content of about 24 weight percent and a viscosity of 120 cP at 25° C.

PREPARATION OF THE FOAM SAMPLES

Foam Sample 1 was prepared by reacting the quasi-prepolymer with the resin component in the proportions indicated below in Table II. The resin component ingredients were combined in the stated amounts by mixing at about 2,400 rpm using a 3" mixer blade for ten seconds at each successive addition. The resin and iso components were loaded into a Cannon machine, impingement mixed at about 180 bar, and shot into an 8"×8"×2" open preheated mold at about 220 gps for Sample 1 and 220 gps for Sample 2. The mold was closed and clamped while the system foamed. The part was demolded and tested, the results of which are reported below. As a comparison, the mechanical properties of a typical freon-blown integral skin are also reported.

TABLE II

| INGREDIENTS | POLYOL A | POLYOL E | EG | DEG | BL-11 | XFE-1027 | UL-1 | LIAL-125 | X2-5384 |
|---|---|---|---|---|---|---|---|---|---|
| FOAM SAMPLE 1 | 62.15 | 25 | 4.5 | 2 | 0.2 | 0.6 | 0.05 | 0.6 | 0.2 |
| FOAM SAMPLE 2 | 60.98 | 28.95 | 4.74 | 2.11 | 0.32 | 0.63 | 0.05 | 0.63 | 0.21 |

| INGREDIENTS | UNIVUL AO3 | GIVSORE UV-1 | WATER | LiOAc Solvent[a] | PPK | TOTAL | QUASI-PREPOLYMER |
|---|---|---|---|---|---|---|---|
| FOAM SAMPLE 1 | — | — | — | 1.2 | 3.5 | 100 | 67.3 |
| FOAM SAMPLE 2 | 0.35 | 0.18 | 0.85 | — | — | 100 | 63.1 |

[a]70.632% water

TABLE III

| | 50% | TABER | TENSILE STRENGTH |
|---|---|---|---|

TABLE III-continued

| PROPERTIES | DENSITY (pcf) | COMPRESSION SET @ 158° F. | ABRASION (mg, loss, 18 whis) | SKIN | CORE | SKIN & CORE | ELONGATION (% BREAK) SKIN |
|---|---|---|---|---|---|---|---|
| FOAM SAMPLE 1 | 27.3 | 21.1 | 159 | 630 | 403 | 481 | 160 |
| FOAM SAMPLE 2 | 30 | 15.4 | 67 | 609 | 226 | 525 | 208 |
| FREON SYSTEM | 29 | 19 | 69.3 | 857 | 219 | 510 | 127 |

| PROPERTIES | ELONGATION (% BREAK) | | GRAVES TEAR (pi) | | | SPLIT TEAR (pi) | | |
|---|---|---|---|---|---|---|---|---|
| | CORE | SKIN & CORE | SKIN | CORE | SKIN & CORE | SKIN | CORE | SKIN & CORE |
| FOAM SAMPLE 1 | 117 | 123 | 142 | 48.5 | 90 | 25.6 | 12.9 | 20.4 |
| FOAM SAMPLE 2 | 187 | 203 | 98 | 47.2 | 84.6 | 29.3 | 18 | 22.3 |
| FREON SYSTEM | 117 | 123 | 99 | 23 | 53 | 27 | 8 | 19 |

The results indicate that the properties of the water-blown integral skin foam, when compared to a typical freon-blown system, remained well within acceptable limits. Most notable was the improvement in Graves Tear over a water-blown sample without lithium acetate and over the typical freon-blown system. While Taber Abrasion increased, a loss of less than 200mg is satisfactory. The drop in elongation compared to Foam Sample 2 with straight water was expected since the cell-opening effect of lithium acetate would tend to decrease elongation. Thus, the results demonstrate that the presence of lithium salts does not prevent the successful manufacture of a water-blown integral skin foam.

What we claim is:

1. A flexible polyurethane foam comprising the reaction product of an MDI (methylene disocyanate), PMDI (polymethylene polyphenylene polyisocyante); or isocyanates having carbodiimide, allophonate, urethane, urea, or biuret groups based on said MDI or PMDI with a polyol composition comprising:
   a) a polyol compound having at least two reactive hydrogens;
   b) one or more blowing agents;
   c) a tertiary amine polyurethane-promoting catalyst;
   d) optionally a chain extender; and,
   e) a lithium salt of an aliphatic or cycloaliphatic, saturated or unsaturated carboxylic acid having 2-7 carbon atoms.

2. The flexible foam of claim 1, wherein the amount of lithium salt is from 0.1 pbw to 2.0 pbw based on 100 pbw of the polyol composition.

3. The flexible foam of claim 1, wherein the carboxylic acid is selected from the group consisting of acetic acid, propionic acid, and butyric acid.

4. The flexible foam of claim 3, wherein the carboxylic acid is acetic acid.

5. The flexible foam of claim 3, wherein the blowing agent consists essentially of water.

6. The flexible foam of claim 5, wherein the foam is a slabstock foam.

7. The flexible foam of claim 5, wherein the foam is an integral skin foam.

8. A process for the preparation of a flexible polyurethane foam comprising reacting, optionally in an open or closed preheated mold, an MDI (methylene disocyanate), PMDI (polymethylene polyphenylene polyisocyante); or isocyanates having carbodiimide, allophonate, urethane, urea, or biuret groups based on said MDI or PMDI with a polyol composition comprising:
   a) a polyol compound having at least two isocyanate reactive hydrogens, an equivalent weight from about 750 to about 3500, and a functionality from about 1.5 to about 3;
   b) one or more blowing agents;
   c) a tertiary amine polyurethane-promoting catalyst;
   d) optionally a chain extender; and,
   e) a lithium salt of an aliphatic or cycloaliphatic, saturated or unsaturated carboxylic acid having 2-7 carbon atoms.

9. The process of claim 8, wherein the amount of lithium salt is from 0.1 to 2.0 parts by weight based on 100 parts by weight of the polyol composition.

10. The process of claim 8, wherein the carboxylic acid is selected from the group consisting of acetic acid, propionic acid, and butyric acid.

11. The process of claim 10, wherein the carboxylic acid is acetic acid.

12. The process of claim 10, wherein the blowing agent consists essentially of water.

* * * * *